United States Patent
Esterzon et al.

[15] 3,636,747
[45] Jan. 25, 1972

[54] MECHANISM FOR CLAMPING A BLANK IN A MACHINE FOR ROLLING SPLINES

[72] Inventors: Mikhail Abramonvich Esterzon; Jury Georgievich Kozyrev, both of Moscow, U.S.S.R.; Mikhail Osipovich Yakobson, deceased, late of Moscow, U.S.S.R.; Anna Semenovna Yakobson, executor, Profsojuznaya ulitsa 40, Korpus 1, kv. 33, Moscow, U.S.S.R.

[22] Filed: Sept. 16, 1969

[21] Appl. No.: 858,915

[52] U.S. Cl.................................................72/214, 90/89
[51] Int. Cl..........................................................B21b 13/12
[58] Field of Search................72/214, 293, 294, 212, 224; 29/406, 159.2; 279/1 L; 90/87, 88, 89

[56] References Cited

UNITED STATES PATENTS

| | | | |
|---|---|---|---|
| 2,698,185 | 12/1954 | Sloan | 279/1 L UX |
| 2,991,672 | 7/1961 | Meyer et al. | 80/16.3 |
| 2,991,673 | 7/1961 | Van Roolj | 72/214 X |

*Primary Examiner*—Milton S. Mehr
*Attorney*—Waters, Roditi, Schwartz and Nissen

[57] ABSTRACT

A clamping device for holding a blank in a machine for making splines by a multiroller rolling head comprises a stationary supporting center and a clamping center which is moved by a drive means along guides located in the head housing and may be angularly self-adjusted during the rolling process.

3 Claims, 2 Drawing Figures

MECHANISM FOR CLAMPING A BLANK IN A MACHINE FOR ROLLING SPLINES

The present invention relates to an improvement in machines for rolling splines by means of a multiroller rolling head and more particularly to means for clamping a blank in these machines.

Known in the art is a mechanism for clamping a blank in a machine for rolling splines by a multiroller rolling head, which mechanism comprises a supporting center and a clamping center to be moved along suitable guides by a longitudinal-travel drive.

The known mechanism is disadvantageous in that said guides are mounted on the elements of the supporting structure of the machine rigidly connected to the guides of the slider carrying a multiroller rolling head so that the mutual position of the blank and said rolling head may be changed during the process of rolling because the rolling head may be displaced from the center line of the machine under the action of forces developed in the process of rolling. Such a construction of the mechanism impairs the accuracy of the rolling.

Furthermore, the known mechanism is not equipped with any means for compensating for the positional errors of the multiroller rolling head and of the blank mounted in the centers.

A specific object of the invention is to provide a mechanism for clamping a blank in a machine for rolling splines by a multiroller rolling head characterized by an arrangement of the guides of the clamping centers which make it possible to eliminate the above-mentioned disadvantages.

This object is attained by providing a mechanism for clamping blanks in a machine for rolling splines by means of a multiroller rolling head comprising a supporting center and a clamping center moved along guides by a drive; according to the invention the guides of the clamping center are mounted in the housing of the multiroller rolling head, while mounted between the clamping center and the drive for moving this head is a link providing for reliable connection of these elements.

Said link may consist of a rod with spherical heads at its ends, one of these heads forming spherical head at each end, one spherical joint for the body of the clamping center and the other head forming a spherical joint for the output element of the drive.

The clamping center is preferably provided with a replaceable centering member having a centering tip disposed eccentrically relative to the axis of the clamping center, the value of eccentricity compensating for the adjusting errors.

The proposed mechanism for clamping a blank in a machine for rolling splines eliminates any possibility of displacement of the rolling head and blank relative to each other and allows the adjusting errors to be compensated, thus providing for a high accuracy of the rolling.

Other objects and advantages of the present invention will be apparent upon consideration of the following description of a preferred embodiment thereof taken in conjunction with the accompanying drawings, in which.

Figure 1:
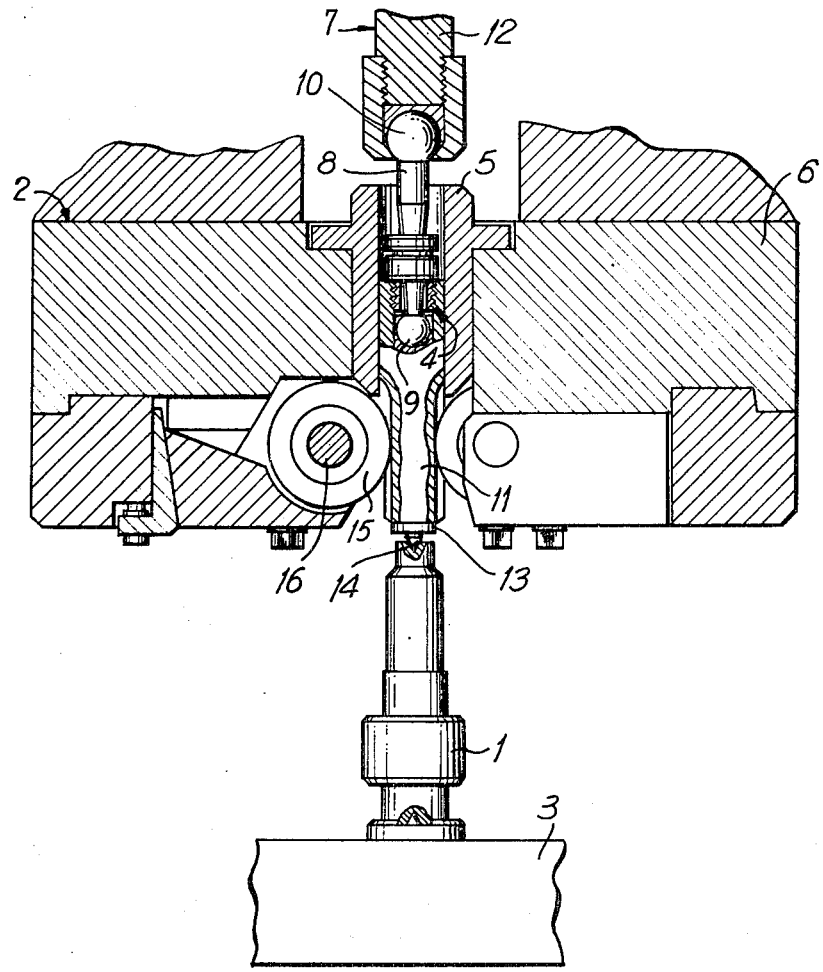
FIG. 1 is a sectional view of a mechanism for clamping a blank arranged in the housing of the rolling head shown in the initial position, according to the invention.

The proposed mechanism for clamping a blank 1 (FIG. 1) in a machine (not shown) for rolling splines by a multiroller rolling head 2 comprises a supporting center 3 mounted on the bearing structure (not shown) of the machine and a clamping center 4 mounted in guides 5 in a form of a bushing arranged in the housing 6 of the rolling head 2. The clamping center 4 has a drive 7 constituted as a hydraulic cylinder. Mounted between the clamping center 4 and the drive 7 is an intermediate link 8 consisting of a rod with spherical heads 9 and 10 at the ends. The head 9 serves as a spherical joint for a body 11 of the clamping center 4, while the head 10 serves as a spherical joint for the output element, that is the plunger 12 of the drive 7. Such a construction of the intermediate link 8 provides for a reliable connection of the clamping center 4 with the drive 7.

The clamping center 4 contains a replaceable centering member 13. Centering tips 14 arranged either eccentrically relative to the axis of the clamping center 4 or coaxial with the latter. The magnitude of eccentricity is intended to compensate for adjusting errors as will be explained later.

The machine operates as follows.

Figure 2:
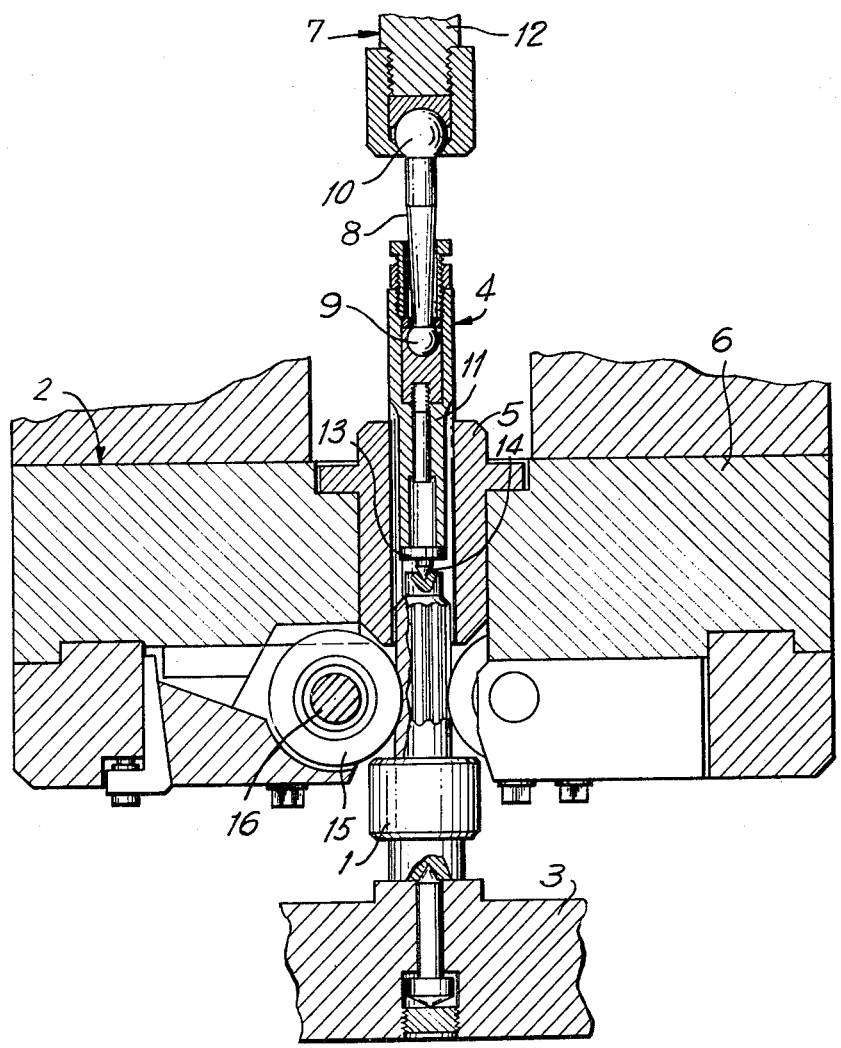
FIG. 2 shows the same mechanism after the working stroke.

The blank 1 is mounted on the supporting center 3, then the clamping center 4 is moved towards the blank 1 by means of the drive 7. The clamping center 4 is provided with a centering member 13 having a coaxial tip 14. As a result, the blank is clamped as shown in FIG. 1. Thereafter, the rolling head 2 with the rollers 15 mounted on the shafts 16, moves along the axis of the blank 1, to effect a working stroke after which the head is in the position shown in FIG. 2. Thereafter, a signal is produced for carrying out a reverse stroke.

Since the head 2 in the process of rolling may be displaced in a radial direction due to the effect of manufacturing errors of the rollers 15 or the rolling head 2, uneven rigidity of the latter in the radial direction, etc., the head 2 is initially used for rolling the so-called adjusting blanks to determine the value and direction of the required eccentricity of the centering tip 14 of the centering member 13. After this has been determined, the centering member 13 replaced by a different centering member 13 having the required eccentricity of the centering tip 14 relative to the axis of the clamping center 4. Then the process is repeated.

The proposed mechanism makes it possible to roll blanks 1 with a great accuracy because the guides 5 of the clamping center 4, moving together with the rolling head 2 during the process of rolling secure the body 11 of the clamping center 4 positively in the direction of movement of the rolling head 2. Due to the movable connection of the drive 7 with the clamping center 4 the position of the latter does not depend on the position of the output element of the drive 7.

The proposed mechanism provides for a high accuracy of rolling as regards such important parameters as the parallelism of the splines relative to the axis of the blank 1 and the accumulated error of the spline pitch.

What is claimed is:

1. A mechanism for clamping a blank in a machine for rolling splines by a multiroller rolling head comprising in combination: a supporting center, a clamping center pressing the blank against said supporting center, a drive means for longitudinal displacement of said clamping center, guides on said clamping center mounted in the housing of the multiroller rolling head, and an intermediate link mounted between said clamping center and said drive means and providing for angular alignment adjustment thereof.

2. A mechanism as claimed in claim 1, in which said intermediate link is a rod with a spherical head at its one of these heads forming a spherical joint with the clamping center, and the other head forming a spherical joint with the drive means.

3. A mechanism as claimed in claim 1, in which the clamping center comprises a replaceable centering member having a centering tip, said centering tip being positioned eccentrically relative to the axis of the clamping center with a value of eccentricity compensating for the adjusting errors.

* * * * *